Feb. 8, 1949.   J. L. M. FRÉJACQUES   2,461,048
METHOD FOR SEPARATING AQUEOUS AZEOTROPIC MIXTURES
Filed April 24, 1945
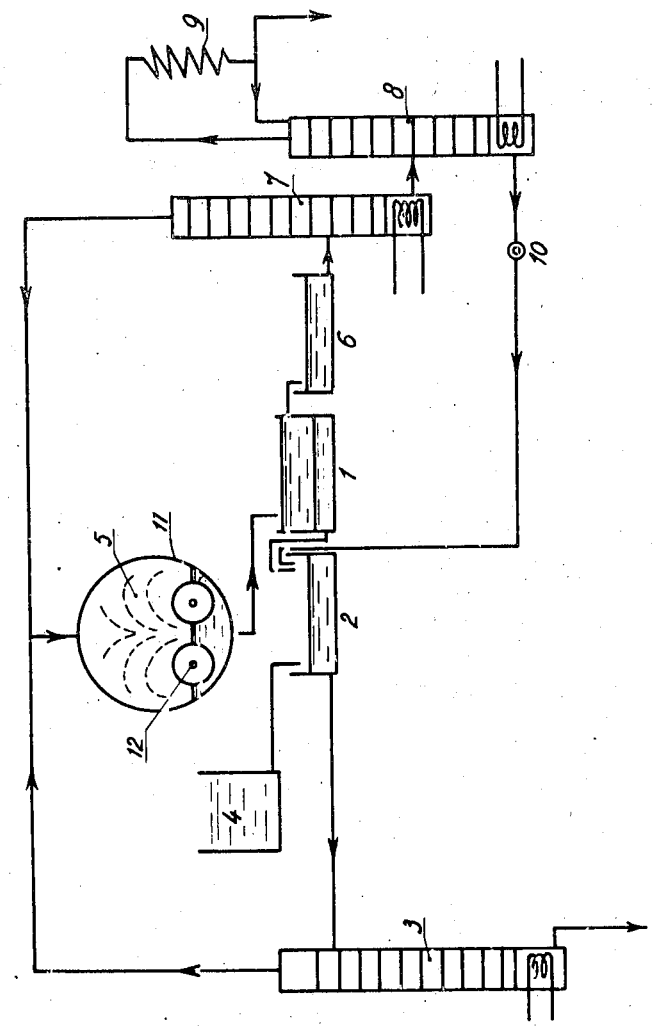
INVENTOR:
JEAN LÉON MAURICE FRÉJACQUES,
BY
ATTORNEY

UNITED STATES PATENT OFFICE 2,461,048

METHOD FOR SEPARATING AQUEOUS AZEOTROPIC MIXTURES

Jean Léon Maurice Fréjacques, Paris, France, assignor to Compagnie de Produits Chimiques et Electrometallurgiques Alais, Froges et Camargue, Paris, France, a corporation of France Application April 24, 1945, Serial No. 590,107
In France February 19, 1942

Section 1, Public Law 690, August 8, 1946
Patent expires February 19, 1962

5 Claims. (Cl. 202—57)

The present invention relates to the aqueous azeotropic mixtures that have the property of separating into two layers when saturated with an alkaline carbonate; one of the layers being richer in water than the azeotrope. This is the case, in particular, of normal propyl alcohol, isopropyl alcohol, acetonitrile, or methylethylcetone, etc.

According to my invention, this separation is performed by means of ammonium carbonate, the two layers that are formed being separated by decantation and then distilled so as to extract therefrom on one hand the two components of the original azeotropic mixture in the pure state and on the other hand carbon dioxide and of ammonia from the decomposition of the ammonium carbonate, which is then reconstituted for further use.

The method may be carried out in the following manner: The mixture to be treated is saturated with carbon dioxide and ammonia. The two layers that are formed are separated by decantation. The layer that is richer in water is then distilled, in order to separate the carbon dioxide, the ammonia and the portion of the substance to be dehydrated that is contained in this layer and is evolved as an azeotrope.

Water is evolved at the end of the distillation while the distilled ammonia and carbon dioxide are recycled for further use. The layer that is poorer in water is subjected separately to fractional distillation. All the water it contains is evolved at the beginning as an azeotrope, together with a little amount of carbon dioxide and ammonia and the desired anhydrous product remains. Finally all the water flows out at the bottom of the first column and the other anhydrous component at the end of the second column.

I have diagrammatically shown by way of example, in the accompanying drawing, an apparatus for dehydrating isopropyl alcohol according to my invention. The mixture, saturated with ammonium carbonate, passes into florentine separator 1 where it separates into two layers; the lower layer is sent to vat 2 which in turn feeds column 3 which receives also from vat 4 an aqueous solution of the alcohol to be treated. All the water to be eliminated flows out through the lower end of this column whereas all the carbon dioxide and all the ammonia contained in the aqueous layer escape through its upper end together with the small amount of isopropyl alcohol that it contains, which passes near 80° C. as an azeotropic mixture.

All these distillates are condensed in refrigerator 5. The light layer from separating vat 1 is sent to vat 6 which feeds plate column 7.

The evolved azeotrope passes out at the top of said column into the refrigerator 5 where it is brought into contact with the ammonium carbonate from column 3. Anhydrous alcohol flows out at the bottom of the column 7. When the mixture to be treated contains heavy impurities the anhydrous alcohol, instead of being directly removed from the bottom of column 7, is made to pass into another column 8 from which the pure anhydrous product is distilled at the beginning of distillation at 82° C., to be collected in refrigerator 9 while a little amount of alcohol charged with impurities passes at the end and is sent through a pump 10 into vat 2 and from said vat into column 3. In this case, the heavy impurities pass out at the bottom of this column 3 together with the water to be removed. When the operation is well attended to, from 30 to 40% of the alcohol in the cycle may be expected at the outlet of column 8 in the pure state as a product of the operation. At the beginning of the operation, the necessary carbon dioxide and ammonia are sent directly into refrigerator 5.

It is of interest to use a slight excess of ammonia, the neutral carbonate producing generally a more intense separation than either the sesquicarbonate or the bicarbonate. In subsequent stages of the operation it is sufficient to inject the exact amounts of $CO_2$ and $NH_3$ required for compensating the losses, which are however very small in the case of properly built apparatus. Determination of the amount of gas to be added is easily performed by observing the apparition of solid carbonate crystal at the outlet of the refrigerator 5.

The latter is built in a somewhat special manner. Simple worms or ordinary tubular bundles may be frequently stopped up by carbonate crystals in case of bad working and require too careful a supervision. It is preferable to use a refrigerator which cannot be obstructed by the accidental formation of crystals. It is possible, for instance, to use towers through which a certain amount of condensed liquid is caused to flow, said liquid circulating therein after it has been cooled in an ordinary refrigerator.

The refrigerator shown at 5 in the drawing is particularly convenient in the case that is considered. It is constituted by a cylindrical horizontal receiver 11 containing two shafts 12 provided with hollow blades. Rotation of these shafts causes said blades to atomise part of the condensate inside the vapours to be cooled. A circulation of cold water inside the blades eliminates the heat that is produced. Owing to the speed of revolution of the discs and to the stirring of the liquid, the heat interchanges are excellent and the crystals, if any are formed, are constantly returned into suspension and cannot produce any obstruction.

Other condensing means may be used to the same purpose without of course departing from the scope of the invention. Likewise the general arrangement may be modified according as to whether such phase is heavier than such other and according to the temperatures of passage of the different distillates.

I may also insert a filter between refrigerator 5 and separator 1. This filter keeps back the crystals formed at certain times; these crystals redissolve at other times and finally the working of the apparatus is made more regular and their supervision easier.

My improved method is particularly of interest when the azeotrope to be treated contains as an impurity ammonium carbonate which automatically compensates the losses. This is the case for instance for the azeotropic mixture of water and acetonitrile that is obtained through the action of ammonia on acetylene at 350–500° C. in the presence of suitable catalysers and of a little steam.

What I claim is:

1. The method of treating the azeotropic mixtures of water with a compound taken from a group consisting of methylethylketone, propyl alcohol, isopropyl alcohol and acetonitrile, which comprises treating such an azeotropic mixture with ammonium carbonate, separating by decantation the two layers thus formed and distilling said layers separately to extract on the one hand the two components of the initial azeotropic mixture in the pure state and on the other hand carbon dioxide and ammonia.

2. The method of treating the azeotropic mixtures of water with a compound taken from a group consisting of methylethylketone, propyl alcohol, isopropyl alcohol and acetonitrile, which comprises treating such an azeotropic mixture with ammonium carbonate, separating by decantation the two layers thus formed, distilling said layers separately to extract on the one hand the two components of the initial azeotropic mixture in the pure state and on the other hand carbon dioxide and ammonia, causing said two last mentioned bodies to react together to form ammonium carbonate and recycling this ammonium carbonate.

3. The method of treating the azeotropic mixtures of water with a compound taken from a group consisting of methylethylketone, propyl alcohol, isopropyl alcohol and acetonitrile, which comprises treating such an azeotropic mixture with ammonium carbonate, separating by decantation the two layers thus formed, distilling said layers separately to extract on the one hand the two components of the initial azeotropic mixture in the pure state and on the other hand carbon dioxide and ammonia, and recycling the azeotropic mixtures forming intermediate fractions of the distillation process.

4. The method of treating the azeotropic mixtures of water with a compound taken from a group consisting of methylethylketone, propyl alcohol, isopropyl alcohol and acetonitrile, which comprises treating such an azeotropic mixture with ammonium carbonate, separating by decantation the two layers thus formed, distilling said layers separately in fractional distillation apparatus, extracting from said apparatus on the one hand the two components of the initial azeotropic mixture in the pure state and on the other hand carbon dioxide and ammonia, recycling these two last mentioned bodies in the form of ammonium carbonate, condensing the intermediate azeotropic mixtures collected at the tops of said fractional distillation apparatus, and recycling them.

5. The method of treating the azeotropic mixtures of water with a compound taken from a group consisting of methylethylketone, propyl alcohol, isopropyl alcohol and acetonitrile, which comprises treating such an azeotropic mixture with ammonium carbonate, separating by decantation the two layers thus formed, distilling said layers separately in fractional distillation apparatus, extracting from said apparatus on the one hand the two components of the initial azeotropic mixture in the pure state and on the other hand carbon dioxide and ammonia, recycling these two last mentioned bodies in the form of ammonium carbonate, condensing the intermediate azeotropic mixtures collected at the tops of said fractional distillation apparatus by passage thereof through towers in which a certain amount of distillation products condensed in a conventional type refrigerator is circulated, and recycling said intermediate azeotropic mixtures.

JEAN LÉON MAURICE FRÉJACQUES.

REFERENCES CITED

The following references are of record in the file of this patent:

UNITED STATES PATENTS

| Number | Name | Date |
|---|---|---|
| 1,350,254 | Frankforter | Aug. 17, 1920 |